C. B. LONG.
Sight for Ordnance
No. 37,076.  Patented Dec. 2, 1862.
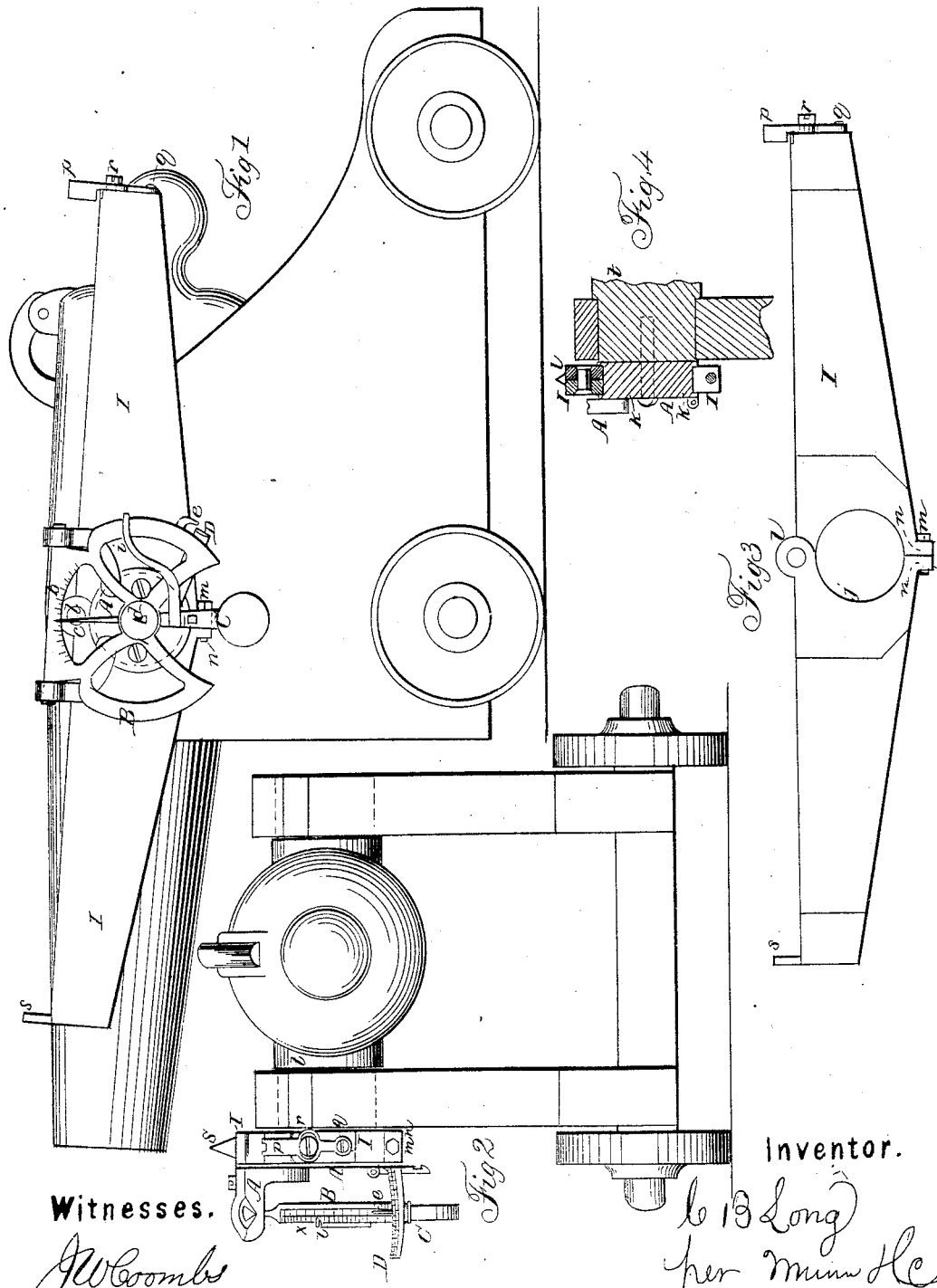
Witnesses.  Inventor.

UNITED STATES PATENT OFFICE.

CHAS. B. LONG, OF WORCESTER, MASSACHUSETTS, ASSIGNOR TO HIMSELF, AUGUSTUS RICE, AND JONATHAN LUTHER, OF SAME PLACE.

IMPROVEMENT IN ADJUSTABLE SIGHTS FOR ORDNANCE.

Specification forming part of Letters Patent No. 37,076, dated December 2, 1862.

*To all whom it may concern:*

Be it known that I, CHARLES B. LONG, of the city of Worcester, in the county of Worcester and State of Massachusetts, have invented certain new and useful Improvements in Devices for Sighting and Indicating the Elevation of Ordnance; and I do hereby declare that the following is a full, clear, and exact description of the same, reference being had to the accompanying drawings, forming a part of this specification, in which—

Figure 1 is a side view of a cannon having my invention applied. Fig. 2 is a rear view of the same. Fig. 3 is a side view of the sighting-bar detached from the indicating device. Fig. 4 is a transverse section of the sighting-bar, the frame of the indicating-instrument, and a portion of the trunnion to which they are attached.

Similar letters of reference indicate corresponding parts in the several figures.

This invention relates in part to the device for indicating the elevation of ordnance which constitutes the subject-matter of Letters Patent No. 36,054, granted to myself, Augustus Rice, and Jonathan Luther; and it consists in combining a sighting-bar with the device for indicating the elevation of the piece on the same side of the gun as the latter device, so that the sighting of the gun and the adjustment of the elevation may be directed by the same man and at the same time.

To enable others skilled in the art to make and use my invention, I will proceed to describe its construction and operation.

A is the plate or frame, of brass or other metal, to which all the working parts of the indicating device are attached, made like that described in Letters Patent No. 36,054, except that the circular portion which is bolted to the end of the trunnion $t$ of the gun is made thicker, that a portion of it may constitute a journal, $k$, Fig. 4, upon which the sighting-bar I is made adjustable.

B is the pendulous frame or dial, constructed with a scale, $b$, and otherwise as described in the Letters Patent hereinbefore mentioned, but having an additional scale of degrees, $x$, (see Fig. 2,) upon its rear edge, said edge being in the form of an arc concentric with the axis of oscillation of the pendulum C. This axis is formed by the knife-edged pivot $d$, by which the said pendulum is suspended from the pendulous frame B. The said pendulum has attached to it, besides the index $c$, which indicates the elevation upon the scale $b$, a second index, $i$, which indicates it upon the back scale, $x$. The front edge of the pendulous frame B may have upon it another scale like $x$, so that the instrument may be applied to either trunnion of the gun, and one scale will be presented toward the rear, and the index $i$ may be capable of being moved to suit either of the said scales. By providing an additional scale and index visible from the rear of the gun, great facility is afforded for taking a quick and accurate aim, while the side scale, $b$, and index $c$ enable the officer standing at the side of the gun to see the elevation, and it is in this combination of scales and indices that the first part of my invention consists.

Instead of the scale D and index $e$, by which the lateral inclination of the gun-carriage is indicated, being at the top of the instrument, as described in the Letters Patent hereinbefore mentioned, the said scale and index are arranged in rear of the instrument, as shown in Figs. 1 and 2, as I consider this arrangement more convenient.

The sighting-bar I is made with a bearing, $j$, to fit the journal $k$, provided on the plate A close to the trunnion for its reception. In order to provide for the convenient application of the said bar to the journal, the said bar is represented as made of two pieces connected by a rule-joint, $l$, which opens to permit the bearing $j$ to pass over the trunnion, and when the bar has been put on and its bearing closed upon the trunnion it is secured by a screw, $m$, passing through one and screwing into another of two lugs, $n$ $n$, provided on the two portions of the bar.

The bar may be fitted and secured to the journal $k$ in any other manner than that described, which will permit it to be adjusted upon the said journal for sighting any object; or it may be attached to the gun on the same side as the indicating device in any other way than by attaching it directly to the said device itself.

By combining the sighting-bar and the device for indicating the elevation of the gun upon the same side of the gun, instead of applying the sighting-bar on the opposite side, as has been necessary in previous applications of the indicating device, much greater facility is afforded for sighting when the gun is elevated.

$s$ is the front sight, and $p$ the back sight, of the sighting-bar I. The front one, $s$, is fixed; but the back one, $p$, is made laterally adjustable by being attached to the rear end of the bar by a screw, $q$, upon which it is capable of swinging from side to side, and it is capable of being secured, when adjusted, by means of a set-screw, $r$, which passes through a slot provided in the sight for its reception, and screws into the end of the bar. By making this sight laterally adjustable the bar is adapted to the correct sighting of objects at different distances, and the drift of the ball may be compensated for by a proper adjustment of the sight.

The indicating device, besides serving to indicate the elevation of the gun, serves to indicate the level of the gun carriage or platform, and will afford great facility for the leveling of the platforms of guns.

What I claim as my invention, and desire to secure by Letters Patent, is—

Combining the sighting-bar and the device for indicating the elevation on the same side of the piece, substantially as and for the purpose herein specified.

CHARLES B. LONG.

Witnesses:
 THOS. H. THOMPSON,
 WM. GREENLEAF.